(12) United States Patent
Reuter

(10) Patent No.: US 7,777,702 B2
(45) Date of Patent: Aug. 17, 2010

(54) SYSTEM AND METHOD FOR DRIVING SOLID-STATE LIGHT SOURCES

(75) Inventor: Fred Jay Reuter, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1029 days.

(21) Appl. No.: 11/484,827

(22) Filed: Jul. 11, 2006

(65) Prior Publication Data

US 2008/0012997 A1  Jan. 17, 2008

(51) Int. Cl.
G09G 3/32 (2006.01)
G09G 3/34 (2006.01)
G09G 3/36 (2006.01)

(52) U.S. Cl. .......................... 345/82; 345/84; 345/102; 345/204

(58) Field of Classification Search .................. 345/39, 345/204–214, 5–102; 315/169.3
See application file for complete search history.

(56) References Cited

U.S. PATENT DOCUMENTS

| 4,680,509 A | 7/1987 | Fallier, Jr. et al. |
| 5,450,512 A | 9/1995 | Asakura |
| 5,457,623 A | 10/1995 | Manor |
| 6,570,505 B1 * | 5/2003 | Malenfant ................... 340/641 |
| 6,863,402 B2 | 3/2005 | Roddy et al. |
| 7,230,391 B2 * | 6/2007 | Ravindra et al. ............. 315/219 |
| 7,279,849 B2 * | 10/2007 | Lee ............................. 315/220 |
| 7,288,903 B2 * | 10/2007 | Jang et al. .................... 345/102 |
| 7,446,750 B2 * | 11/2008 | Moon .......................... 345/102 |
| 2006/0284568 A1 * | 12/2006 | Chang et al. ................. 315/282 |

* cited by examiner

Primary Examiner—David L Lewis
(74) Attorney, Agent, or Firm—Charles A. Brill; Wade James Brady, III; Frederick J. Telecky, Jr.

(57) ABSTRACT

System and method for driving solid-state light sources utilizing saturation mode current drivers. A preferred embodiment comprises charging a first drive circuit, discharging the first drive circuit into the solid-state light source, charging a second drive circuit, and discharging the second drive circuit into the solid-state light source. The alternating of the charging and discharging of two drive circuits ensures that there is a minimum amount of time without the capability of providing the drive current to solid-state light source. The use of saturation mode drive circuits ensures that it is possible to rapidly switch the solid-state light source on and off, improving the performance of the solid-state light source by minimizing the minimum amount of light producible by the solid-state light source, while reducing power consumption by eliminating the need to provide a headroom voltage.

20 Claims, 6 Drawing Sheets

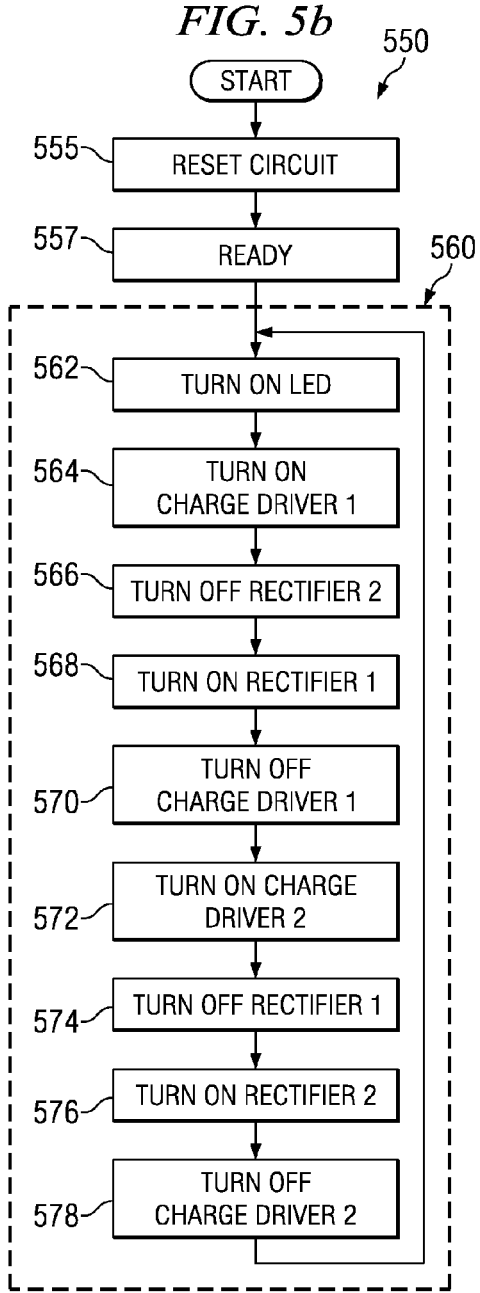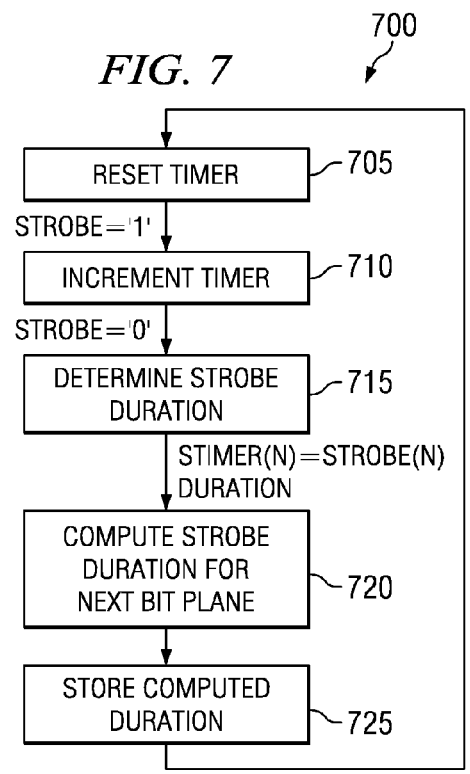

SYSTEM AND METHOD FOR DRIVING SOLID-STATE LIGHT SOURCES

TECHNICAL FIELD

The present invention relates generally to a system and a method for electronic circuits, and more particularly to a system and a method for driving solid-state light sources utilizing saturation mode current drivers.

BACKGROUND

Solid-state light sources, such as light emitting diodes and laser diodes, have begun to replace lamps, such as high intensity arc lamps, in projection based display systems. The solid-state light sources offer advantages over the lamps, which include rapid turn-on, rapid cycling (on-off-on) times, long useful life span, low power consumption, narrow emitted light bandwidths that eliminate the need for color filters to provide desired colors, and so on.

Solid-state light sources can be illuminated with a sequence of current pulses. For example, a pulse width modulated drive current can pulse the solid-state light source on and off, using the duty cycle of the current pulse stream to provide the desired amount of light, while the magnitudes of the current pulses provide the brightness of the light. Linear mode light drivers have been used in the past to provide the drive current. Linear mode light drivers are well understood by those of ordinary skill in the art of the present invention and designs for light driver circuitry can readily be had without a large investment in design time and money.

One disadvantage of the prior art is that to provide adequate light for use in projection based display systems, the solid-state light sources can require a large drive current (on the order of tens of amperes) and relatively high voltages (on the order of a hundred volts). Linear mode drive circuits require a small amount of headroom voltage above what is needed to actually illuminate the solid-state light sources. The headroom voltage (on the order of a few volts) is needed to ensure that the drive circuitry operates in the linear region. However, the headroom voltage, at the high current levels required by the solid-state light sources, implies that a significant amount of power must be generated and dissipated by a power supply. The additional requirements on the power supply can require that a more capable (higher power and higher voltage) power supply be utilized, at an increased cost.

Another disadvantage of the prior art is that the linear mode driver circuits cannot be rapidly switched since the voltage must be allowed to dissipate. Therefore, it may not be possible to switch a solid-state light source as rapidly as required. For example, to increase the contrast ratio of a display system, it is desired to reduce the minimum amount of displayable light. One way to reduce the amount of displayed light is to reduce the amount of time that the light source is powered on. However, if the on time of the light source cannot be shortened, then more elaborate (technically more complex and expensive) techniques may need to be employed to reduce the minimum amount of displayable light.

SUMMARY OF THE INVENTION

These and other problems are generally solved or circumvented, and technical advantages are generally achieved, by preferred embodiments of the present invention which provides a system and a method for driving a solid-state light source.

In accordance with a preferred embodiment of the present invention, a method for driving a solid-state light source is provided. The method includes charging a first drive circuit and discharging the first drive circuit into the solid-state light source. The method also includes charging a second drive circuit and discharging the second drive circuit into the solid-state light source. The method is repeated until a desired amount of light has been created.

In accordance with another preferred embodiment of the present invention, a light source is provided. The light source includes two current sources coupled to a solid-state light element, two rectifiers (with each rectifier coupled to one of the two current sources), and a shunt coupled to the two rectifiers and the solid-state light element. Each current source provides a drive current to the solid-state light element, where the current sources are switched so that only one current source at a time provides the drive current. The two rectifiers eliminate an AC bias present in the drive current produced by the two current sources and the shunt directs the drive current either away from or to the solid-state light element.

In accordance with another preferred embodiment of the present invention, a display system is provided. The display system includes a light source, an array of light modulators optically coupled to the light source, and a controller coupled to the array of light modulators and to the light source. The array of light modulators creates images by setting each light modulator in the array to a state for displaying an image on a display plane by modulating light from the light source, and the controller issues commands to the light source to produce light of specified duration and color based on the image. The light source includes two current sources coupled to a solid-state light element, two rectifiers (with each rectifier coupled to one of the two current sources), and a shunt coupled to the two rectifiers and the solid-state light element. Each current source provides a drive current to the solid-state light element, where the current sources are switched so that only one current source at a time provides the drive current. The two rectifiers eliminate an AC bias present in the drive current produced by the two current sources and the shunt directs the drive current either away from or to the solid-state light element.

An advantage of a preferred embodiment of the present invention is that the use of saturation mode driver circuits can allow for rapid switching of the drive current. Therefore, the minimum displayable amount of light can be shortened to increase the contrast ratio and thereby increase the image quality of the projection display system.

A further advantage of a preferred embodiment of the present invention is that the use of multiple current sources can enable the charging of a first current source while a second current source is being discharged (and illuminating the solid-state light source). Therefore, the use of multiple current sources can increase the total on time of the solid-state light source.

Yet another advantage of a preferred embodiment of the present invention is that the use of a gate to control the illumination of the solid-state light source can enable the setting up of the desired drive current prior to illuminating the solid-state light source by enabling the gate. Without the use of the gate to control the illumination of the solid-state light source, it may be necessary to provide compensation for unexpected or undesired light output from the solid-state light source as the drive current is initially provided or finally removed from the solid-state light source.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIGS. 5a and 5b are diagrams of sequences of events in the operation of a light driver, according to a preferred embodiment of the present invention;

FIG. 7 is a diagram of an algorithm for simulating a mechanical aperture for decreasing a minimum displayable amount of light, according to a preferred embodiment of the present invention.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a projection display system illuminated by light emitting diodes. The invention may also be applied, however, to projection display systems utilizing laser diodes. Furthermore, the present invention can be used with any of a wide variety of microdisplay technologies, such a digital micromirror device (DMD), deformable micromirrors, transmissive liquid crystal, reflective liquid crystal, liquid crystal on silicon, and so forth. Additionally, the present invention can be utilized in applications wherein there is a desire to use solid-state illumination while reducing power dissipation.

Figure 1:
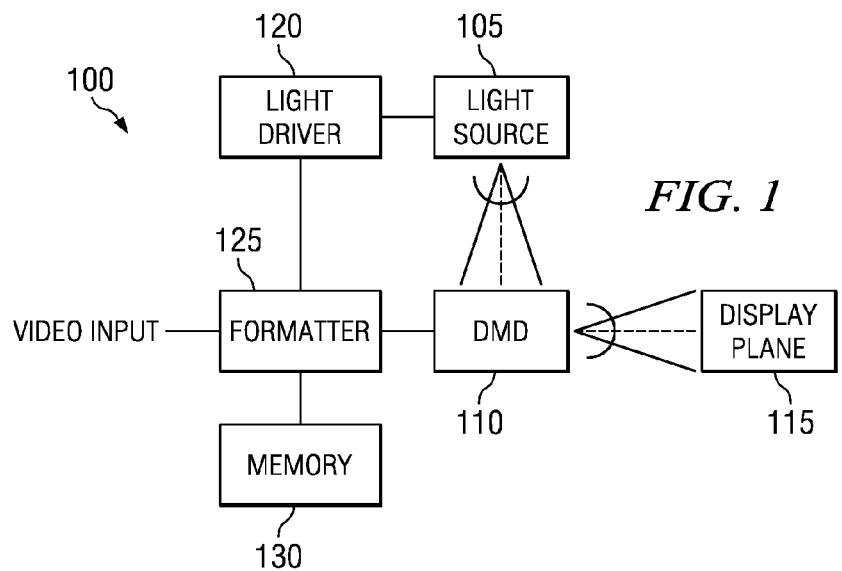
FIG. 1 is a diagram of an exemplary projection display system, according to a preferred embodiment of the present invention.

With reference now to FIG. 1, there is shown a diagram illustrating an exemplary projection display system 100, wherein the display system 100 utilizes a solid-state light source, according to a preferred embodiment of the present invention. The display system 100 shown in FIG. 1 is a typical projection display system, wherein a light from a light source 105 reflects off a DMD 110 (or some other array of spatial light modulators) and onto a display plane 115. Depending upon the technology utilized, the light may pass through the array of spatial light modulators before being displayed on the display plane 115. Depending upon the type of light elements (not shown) used in the light source 105, color filtration may be needed to provide the desired colors of light. In a light source that uses solid-state light elements, it is possible to have multiple solid-state light elements in the light source 105, wherein there are different solid-state light elements capable of producing the desired colors of light. Furthermore, for individual colors, multiple solid-state light elements can be used to provide a desired amount of brightness.

A light driver 120, which can contain necessary circuitry, such as charge drivers, rectifiers, controllers, current source, amplifiers, and so forth, provides the necessary drive current pulses to illuminate the light source 105 as desired. The light driver 120 can be controlled by a formatter 125, which can specify the nature of the drive current being provided to the light source 105. For example, depending on implementation, the formatter 125 can specify the color, the duration, the intensity, the duty cycle, and so forth, of the light. In addition to controlling the light produced by the light source 105, the formatter 125 can be used to convert a video input signal into image data that can be provided to the DMD 110 so that the DMD 110 can modulate the light produced by the light source 105 to display the images in the video input on the display plane 115. The formatter 125 may be coupled to a memory 130, which can be used to store information such as color maps, image bit plane display sequences, and so forth.

Figure 2:
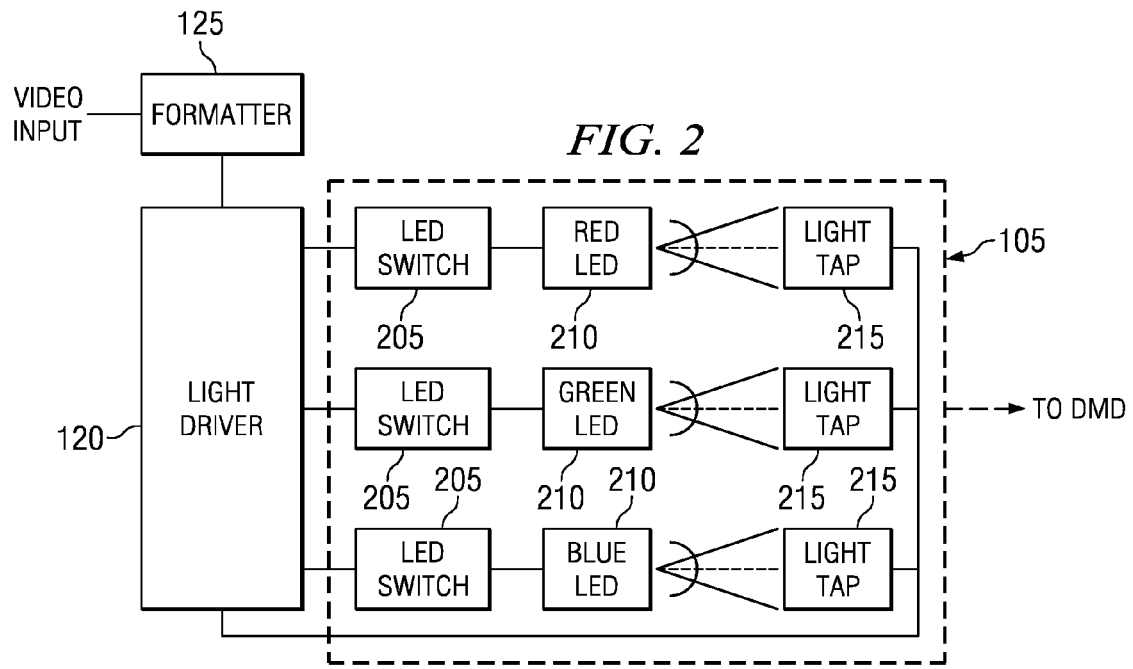
FIG. 2 is a diagram of an illumination system of a projection display system, according to a preferred embodiment of the present invention.

With reference now to FIG. 2, there is shown a diagram illustrating a detailed view of the illumination system of a projection display system, according to a preferred embodiment of the present invention. As discussed previously, the illumination system of the projection display system can include the light source, the light driver 120, and the formatter 125. The light source 105, as shown in FIG. 2, is for a primary color projection display system, and is capable of producing three colors. The light source 105 can produce the colors red (R), green (G), and blue (B). Although the light source 105 is shown in FIG. 2 as being capable of producing three colors, the light source 105 can be readily extended for use in multi-primary projection display systems, including those utilizing four, five, six, and so forth, colors.

For each color produced by the light source 105, the light source 105 can include an LED switch 205, an appropriately colored LED 210 (or LEDs), and a light tap 215. The LED switch 205 can function as a gate to direct the drive current provided to (or away from) the LED 210. Regardless of the drive current, if the LED switch 205 is closed, current is being diverted away from the LED 210 and therefore, the LED 210 will not illuminate. The light tap 215 can be used to measure the light produced by the LED 210 and can be used to control the drive current. For example, if the light tap 215 has measured that the LED 210 has produced the desired amount of light, then the light tap 215 can provide a signal that will result in a termination of the drive current (or the closing of the LED switch 205 so that the drive current will be diverted away from the LED 210) to stop the illumination of the LED 210.

Figure 3:
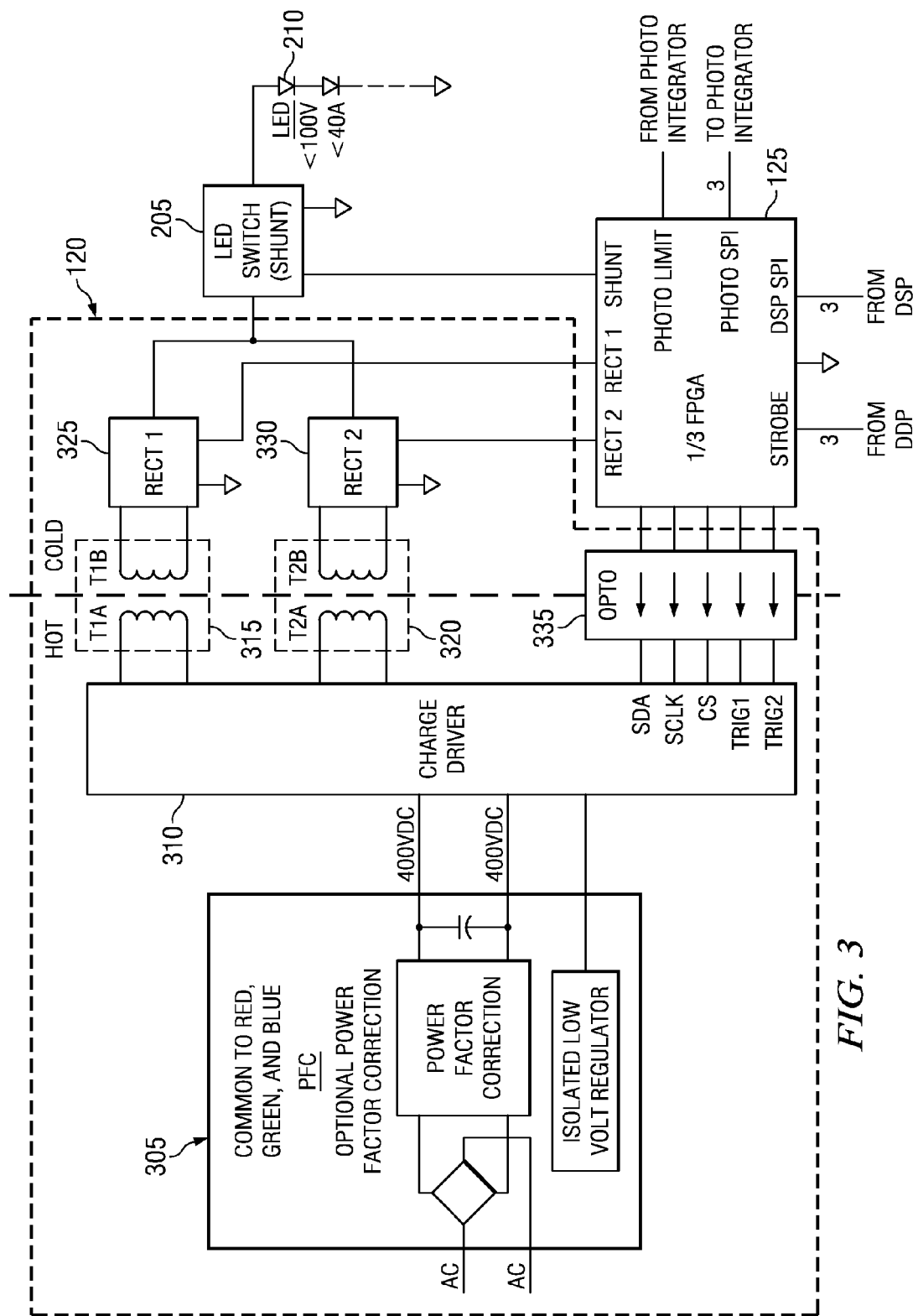
FIG. 3 is a diagram of a high-level schematic of an illumination system of a projection display system, according to a preferred embodiment of the present invention.

With reference now to FIG. 3, there is shown a diagram illustrating a high-level schematic of an illumination system of a projection display system, wherein the circuitry for a single color is illustrated, according to a preferred embodiment of the present invention. The diagram shown in FIG. 3 illustrates the portion of the illumination system of a projection system for a single color of light, for example, red. Portions of the illumination system for other colors of light, such as green and blue (and other colors) are similar and are not discussed herein.

The light driver 120 includes a power conversion circuit 305, which can be responsible for converting AC power into DC power and can include an bridge rectifier, an optional power correction factor circuit (PFC), and an isolated voltage regulator. For example, the power conversion circuit 305 can convert standard 120 VAC line power to 400 VDC power. The light driver 120 can also include a charge driver circuit 310, which can be responsible for charging transformers 315 and 320. The charge stored in the transformers 315 and 320 can provide the necessary current to illuminate the LED 210. Rectifiers 325 and 330, one for each transformer, can be used to remove the AC bias present on the current produced by the transformers 315 and 320 and produce a DC current. Finally, optoisolators 335 can be used to electrically isolate the charge driver circuit 310 from the projection display system 100 and the formatter 125.

The diagram shown in FIG. 3 also displays a portion of the formatter 125 responsible for controlling the operation of the illumination portion of the projection display system. The formatter 125 can be responsible for providing control signals that control the operations of the various circuits in the light driver 120, such as the charge driver circuit 310 and the rectifiers 325 and 330, to control the drive current produced by the transformers 315 and 320. The formatter 125 can also control the state of the LED switch 205 (shunt), which controls the flow of current to the LED 210. However, rather than functioning purely as a switch and turning on or off the drive current to the LED 210, the shunt 205 diverts the drive current towards or away from the LED 215. Although the discussion has been focused on a single LED implementation of the LED 210, multiple LEDs can be used in place of a single LED, with the LED 210 shown in FIG. 3 as a linear sequence of LEDs. However, it is possible to utilize other arrangements of LEDs, such as a parallel arrangement of LEDs or a combination of both parallel and serial arrangements.

Figure 4A:
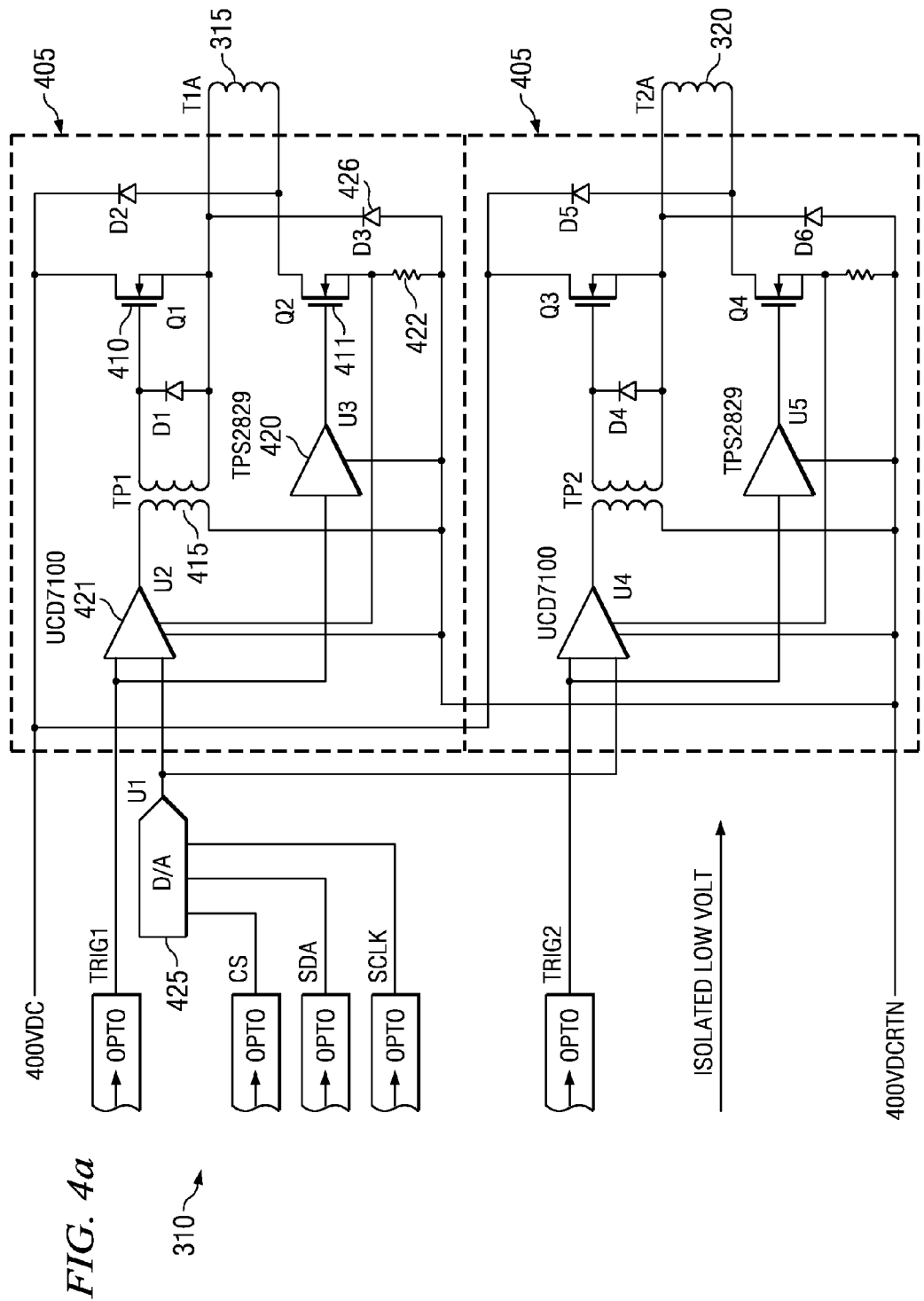
FIGS. 4a through 4c are diagrams of schematics of sections of an illumination portion of a projection display system, according to a preferred embodiment of the present invention.
Figure 4B:
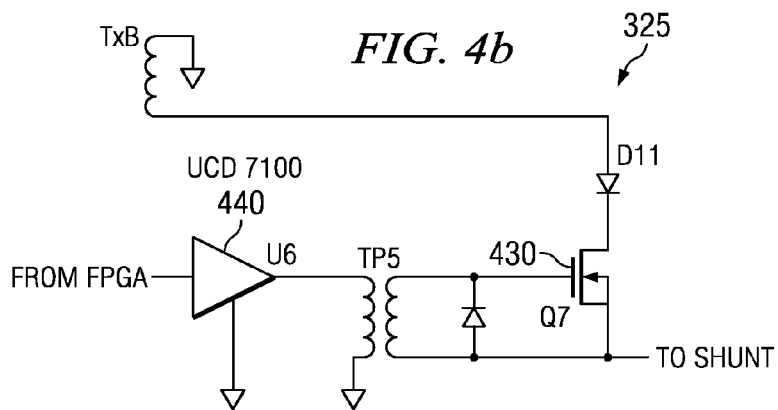
Figure 4C:
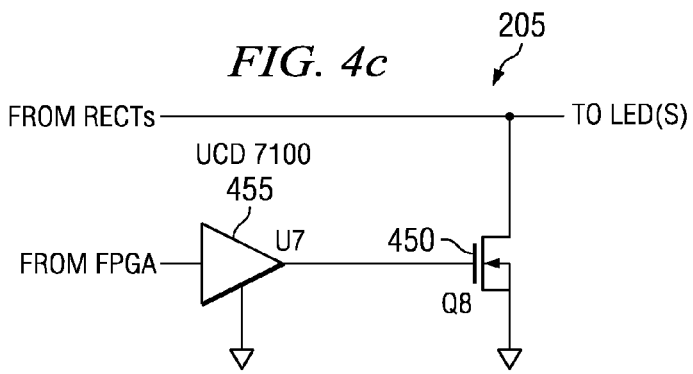

With reference now to FIGS. 4a through 4c, there are shown diagrams illustrating detailed schematics of sections of the illumination portion of a projection display system, according to a preferred embodiment of the present invention. The diagram shown in FIG. 4a illustrates a detailed schematic of the charge driver circuit 310. The charge driver circuit 310 includes a pair of charge drivers 405, one for each of the two transformers 315 and 320. The discussion of the charge driver circuit 310 will focus on one of the two charge drivers 405 since the other charge driver 405 is identical.

The charge driver 405 includes a pair of MOSFET transistors "Q1" 410 and "Q2" 411. According to a preferred embodiment of the present invention, the transistors "Q1" 410 and "Q2" 411 (as well as other transistors discussed herein) are N-type MOSFET transistors, although it is possible to utilize P-type MOSFET transistors with modifications to the design shown, which modifications are considered to be well understood by those of ordinary skill in the art of the present invention. The gate terminal of the transistor "Q1" 410 can be tied to transformer 415 while the source and the drain terminals are coupled in series to the top of the primary winding of the transformer 315. The gate terminal of the transistor "Q2" 411 can be tied to an output of a first driver 420 while the source and the drain terminals are coupled in series to the bottom of the primary winding of the transformer 315. A second driver 421 can be coupled to the transistor "Q1" 410 in a similar manner through the transformer 415. When the transistors "Q1" 410 and "Q2" 411 are on, a current path exists between the power rails of the charge driver circuit 310 and the transformer 315 can charge. The first driver 420 can be controlled by a trigger signal "TRIG 1" that can be used to turn on and off the charging of the charge driver 405. Similarly, the second driver 421 can also be controlled by the trigger signal "TRIG 1" and can be used to turn on and off the charging of the charge driver 405. To stop charging, the transistors "Q1" 410 and "Q2" 411 can be turned off.

According to a preferred embodiment of the present invention, the charging of the transformer 315 can be accomplished in several ways. A first technique that can be used to charge the transformer 315 utilizes elapsed time. Since the inductance of the transformer 315 is known, as well as the voltage potential of the power supply (for example, 400 VDC), the charge is proportional to the inductance, the voltage potential, and the charge time. Therefore, the transistors "Q1" 410 and "Q2" 411 can be turned on for a specified amount of time and then turned off to charge up the transformer 315. Similarly, the transformer 320 can be charged using transistors "Q3" and "Q4."

A second technique that can be used to charge the transformer 315 utilizes current setpoints and makes use of a sense resistor 422. This can be done by setting a current limit with a digital-to-analog converter (shown in FIG. 4a as "CS, SDA, and SCLK" inputs into a digital-to-analog converter 425) to a desired current level, then the transistors "Q1" 410 and "Q2" 411 can be turned on. The second driver 421 will turn off when the sense resistor 422 reaches the desired current level and results in the turning off of the transistor "Q1" 410. The transistor "Q2" 411 can be kept on until it is time to begin charging the transformer 320. Alternatively, the transistor "Q2" 411 can also be turned off with the turning off of the transistor "Q1" 410.

While the transistor "Q1" 410 is off and the transistor "Q2" 411 is on, the charge driver 405 can be in what is referred to as free wheel mode, with the transformer 315 being shorted through a diode 426, thus maintaining the state of the charge in the transformer 315. The maintaining of the charge state in the transformer 315 allows time between when the sense resistor 422 determines that the transformer 315 has been charged to the desired level and when the current is to be provided to the LED 210.

It is also possible to hold the transistor "Q1" 410 in the off state and the transistor "Q2" 411 in the on state. This will hold the charge driver 405 in a charged state. This will allow the charge in the charge driver 405 to remain until it is needed to illuminate the LED 210, providing an alternate way of controlling the illumination of the LED 210 in addition to using the shunt 205.

The diagram shown in FIG. 4b illustrates a detailed schematic of a rectifier, such as the rectifiers 325 and 330. As discussed above, the rectifiers 325 and 330 can be used to remove any AC bias that can be present in the current that is being provided by the transformers 315 and 320. The discussion will focus on the rectifier 325, with the rectifier 330 being identical in structure and operation. The rectifier 325 includes a MOSFET transistor "Q7" 430 (again, biased so that it will operate in the saturation mode), with a gate terminal coupled to a control signal from the formatter 125 through a driver 440. The control signal from the formatter 125 can turn the rectifier 325 on or off. The current from the transformer 315 can flow through the transistor "Q7" 430 and then to the shunt 205. While the transformers 315 and 320 are being charged, the transistor "Q7" 430 may be turned on to permit secondary current flow to occur at the end of a charge cycle.

The diagram shown in FIG. 4c illustrates a detailed schematic of the shunt 205. The shunt 205 includes a MOSFET transistor "Q8" 450 (biased to operate in the saturation mode) with a gate terminal coupled to the formatter 125 through a driver 455. The formatter 125 can control the state of the shunt 205 by turning the MOSFET transistor "Q8" 450 either on or off. With the MOSFET transistor "Q8" 450 on, the currents from the transformers 315 and 320 are routed to ground, while with the MOSFET transistor "Q8" 450 off, the currents are routed to the LED 215. When the transformers 315 and 320 are being charged, the transistor "Q8" 450 may be turned on so that any current will bypass the LED 210.

The transistors in the light driver 120 (such as transistors "Q1" 410, "Q2" 411, "Q7" 430, as well as other transistors shown but not specifically addressed) and the shunt 205 are biased so that they are operating in the saturation mode. By operating the transistors in the saturation mode, the need to provide a headroom voltage is eliminated, thereby reducing the power dissipation requirements of the power supply. Furthermore, the reduced power requirements can also imply a cooler and more efficiently operating projection display system. Additionally, the routing of the current produced by the light driver 120 can occur very rapidly without having to wait for stored charge to dissipate. This can allow for the rapid switching on and off of the LED 210 and provide the desired amount of light.

Figure 5A:
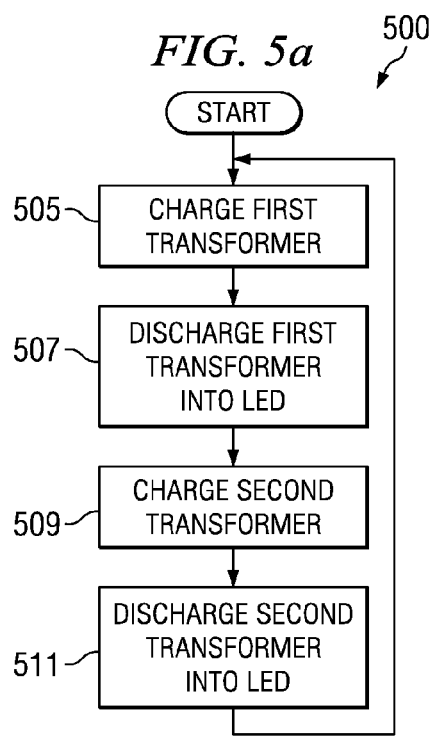

With reference now to FIGS. 5a and 5b, there are shown diagrams illustrating sequences of events 500 and 550, respectively, in the operation of the light driver 120 for the illumination of solid-state light sources in a projection display system. According to a preferred embodiment of the present invention, the light driver 120 utilizes two transformers, with a first transformer being charged while a second transformer is being discharged. While the second transformer is being discharged, it produces a current to illuminate the LED 210, and the first transformer is being charged for when it is to be discharged to illuminate the LED 210. This "ping-pong" action can increase the percentage of time that a drive current is available to illuminate the LED 210 since no time is wasted waiting for the current source to recharge. Although the discussion focused on the use of two transformers, additional transformers can be used. The use of three or more transformers can potentially allow the use of smaller and less expensive transformers.

The diagram shown in FIG. 5a illustrates a high-level description of the operation of the two "ping-pong" transformers in the light driver 120. To enable a "ping-pong" behavior of the two transformers in the light driver 120, it is necessary to charge a first transformer, such as the transformer 315 (FIG. 3), while discharging a second transformer, such as the transformer 320 (FIG. 3). The operation can begin with a charging of the first transformer (block 505) and then discharging the first transformer to provide the drive current for a solid-state light source (block 510). Occurring while the first transformer is discharging (block 507) or as the first transformer becomes discharged, the second transformer can be charged (block 509). Once the second transformer becomes fully charged, the second transformer can be discharged to provide the drive current for the solid-state light source (block 511). The operations can repeat as long as the solid-state light source needs to be illuminated.

The diagram shown in FIG. 5b illustrates a detailed description of the operation of the two "ping-pong" transformers in the light driver 120, wherein the circuitry of the light driver 120 and the rectifiers 325 and 330 and the shunt 205 are as shown in FIGS. 4a through 4c, according to a preferred embodiment of the present invention. The diagram shown in FIG. 5b provides a detailed description of the operation of two "ping-pong" transformers while the diagram shown in FIG. 5a provides a broad high-level description of the operation of the two "ping-pong" transformers. The operations shown in FIG. 5b are specific to the circuitry as shown in FIGS. 3 and 4a through 4c. With a different implementation of the circuitry, the operations may differ slightly.

In order to properly initialize the transformers 315 and 320, it may be necessary to reset the light driver 120 and the shunt 205 (block 555). This can be accomplished by turning off the transistor "Q7" 430 in the rectifier 325 (for the transformer 315). Turning off the transistor "Q7" 430 forces the transformers 315 and 320 to reset (fly-back) into the voltage source through primary windings of the transformer 315 as well as diodes "D1" and "D2" (shown in FIG. 4a). Similarly, turning off a corresponding transistor in the rectifier 330 will cause the transformer 320 to reset. In addition to resetting the transformers 315 and 320, the resetting of the light driver 120 can also involve the following: turning on the shunt 205, turning off charge drivers 405, and resetting a timer. The timer can be used to time the operation of the light driver 120 and ensure that the "ping-pong" operation of the transformers 315 and 320 is properly synchronized. According to a preferred embodiment of the present invention, the resetting can be accomplished by asserting a specified value on a reset line, for example, RESETZ.

After resetting the light driver 120 and the shunt 205 (block 555), the light driver 120 and the shunt 205 are ready to enter a normal operation mode (block 557) and will wait in the ready state until the specified value is removed from the reset line, RESETZ. Once the specified value is removed from the reset line, RESETZ, the light driver 120 and the shunt 205 can enter a normal operating mode, which can be collectively referred to as "LED DRIVER" mode 560. In LED DRIVER 560, the transformers 315 and 320 are alternately charged and discharged to provide a drive current to the LED 210, with the timer controlling the timing of the charging and the discharging.

A first operation in the LED DRIVER mode 560 can be to enable the LED 210 to turn on (block 562). To turn on the LED 210, it is necessary to turn off the shunt 205 so that any current provided by the transformers 315 and 320 are directed to the LED 210 rather than being re-circulated through the shunt 205 and the transformer (either transformer 315 or 320 that is providing the current). Furthermore, to ensure synchrony, the timer is reset. Although the timer can be reset, it is a continually running timer. With the shunt 205 turned on and the timer reset, a second operation can be to turn on a first charge driver 405 (block 564). The first charge driver 405 can be used to charge the transformer 315, while the second charge drive 405 can be used to charge the transformer 320. To turn on the first charge driver 405, transistors "Q1" 410 and "Q2" 411 can be turned on.

The first charge driver 405 remains on until some time after the timer reaches time T1. Then, when the timer reaches time T2, which can occur at the same time or later than time T1, the rectifier 330 can be turned off (block 566). Although after the reset, the rectifier 330 is already off, the operation at time T2 ensures that the rectifier 330 is off to make sure that the LED 210 is not being driven by a drive current from both transformer 315 and 320. Then, at time T2, the rectifier 325 can be turned on to discharge the current in the transformer 315 into the LED 210 (block 568). With the turning on of the rectifier 325, the first charge driver 405 can be turned off at time T3 (block 570), which can be at the same time as or after time T2. The turning off of the first charge driver 405 enables the transformer 315 to discharge into the LED 210.

With the transformer 315 discharging, it is now possible to charge the transformer 320. This will allow the hiding of the charge time of the transformer 320 behind the discharge of the transformer 315 and minimize times when there is no drive current available for the LED 210. To begin charging of the transformer 320, at time T4, the second charge driver 405 can be turned on (block 572).

Figure 6:
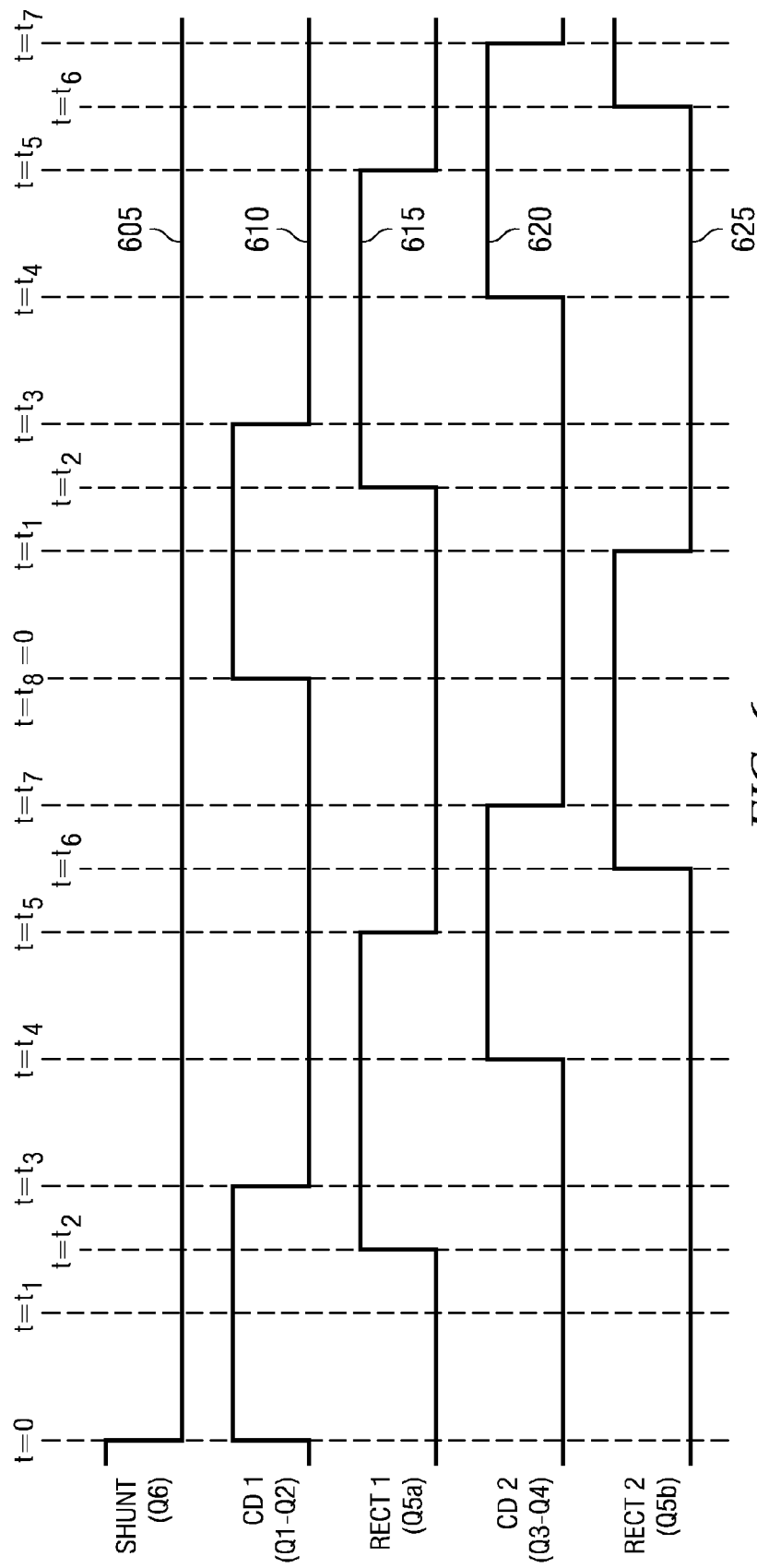
FIG. 6 is a timing diagram of circuit state versus time, according to a preferred embodiment of the present invention.

Then, at time T5, when the transformer 315 is depleted down to a specified level, the rectifier 325 is turned off (block 574), which cuts of the drive current to the LED 210 from the transformer 315. With the drive current from the transformer 315 stopped, the transformer 320 can be discharged to provide a drive current for the LED 210. This can be accomplished by turning on the rectifier 330 at time T6 (block 576). To ensure that both transformers 315 and 320 are not simultaneously driving the LED 210, which could shorten the life of the LED 210, time T6 should occur after time T5. The current from the discharging transformer 320 does not actually begin to flow to the LED 210 until the second charge driver 405 is turned off (block 578), which occurs at time T7. As the second charge driver 405 is turned off at time T7, a single "ping-pong" cycle is complete and the LED DRIVER 560 mode can return to block 562 to begin a next "ping-pong" cycle. A timing diagram shown in FIG. 6 illustrates circuit state versus time in the light driver 120, with a first curve 605 showing the state of the shunt 205, a second curve 610 showing the state of the first charge driver 405, a third curve 615 showing the state of the rectifier 325, a fourth curve 620 showing the state of the second charge driver 405, and a fifth curve 625 showing the state of the rectifier 330.

It is possible to know how much light the LED 210 can provide within a single "ping-pong" cycle, given that the type of LED, the amount of drive current provided by the light driver 120, the duty cycle of the drive current, and so forth, are known. Therefore, when the formatter 125 (FIG. 1) requests a certain amount of light to be provided by the light source 105, a simple computation can be used to determine the number of "ping-pong" cycles that should be used. For example, if the formatter requests 50 units of light and a single "ping-pong" cycle produces two units of light, then after 25 "ping-pong" cycles, 50 units of light would have been produced by the light source 105.

Alternatively, a more robust method for determining how long the LED 210 should be driven in order to provide the requested amount of light can involve measuring the light actually produced by the LED 210 and then shutting off the drive current when the measurement determines that the requested amount of light has been provided. In yet another preferred embodiment of the present invention, a characterization of the drive current can be utilized to accurately determine the operating temperature of the LED 210. Since the amount of light produced by an LED can be dependent of the operating temperature of the LED, the drive current can be modified so that the LED will produce the desired amount of light.

As discussed previously, one significant advantage of using saturation mode current drivers to provide a drive current for the light source 105 is the ability of the saturation mode current drivers to rapidly switch on and off the drive current. The ability to shorten the duration of time that the light source 105 is producing light can reduce the amount of light illuminating the display plane 115 (FIG. 1), which can help to improve the image quality by increasing the projection display system's contrast ratio. Elaborate techniques have been utilized in the past to reduce the amount of light illuminating the display plane, including a mechanical aperture placed in between the light source 105 and the DMD 110 and a neutral density filter that optically attenuates the light from the light source 105. However, these techniques can significantly increase the complexity and the cost of the projection display system, as well as reduce system reliability and performance.

With reference now to FIG. 7, there is shown a flow diagram illustrating an algorithm 700 for implementing a version of the mechanical aperture utilizing the light driver 120 with saturation mode current drivers, wherein the mechanical aperture is replaced with software or firmware, according to a preferred embodiment of the present invention. In a mechanical implementation of a mechanical aperture, prior to the display of a specified amount of light, a command can be provided by the formatter 125 to a controller of the mechanical aperture to move the aperture to a desired location. It is possible to make use of the rapid on and off switching of the saturation mode current drivers to simulate the function of the mechanical aperture.

According to a preferred embodiment of the present invention, the algorithm 700 can execute in the formatter 125, a specially designed integrated circuit that is a part of the formatter 125, a general purpose processor separate from the formatter 125, a digital signal processing unit separate from the formatter, a controller, and so forth. Prior to providing the drive current to illuminate the light source 105 for a desired amount of time, the formatter 125 (or some special purpose processor, controller, or integrated circuit designed to implement the algorithm 700) can reset a timer, which purpose is to time a duration that the saturation mode current drivers are providing a drive current to the light source 105 (block 705). When the saturation mode current drivers begin to provide the drive current to the light source 105, a strobe signal is asserted on a strobe signal line, for example, and the timer can begin (block 710). The timer can continue until the strobe signal is no longer being asserted on the strobe signal line.

Once the strobe signal is no longer being asserted on the strobe signal line, the formatter 125 can determine the duration of time that the drive current was being provided to the light source 105, which is also the duration of the asserted strobe signal, the strobe duration (block 715). Using the strobe duration, the desired amount of light to be produced for the next bit to be shown (bit plane), and the desired value for the mechanical aperture, the formatter 125 can compute the desired duration (block 720). For example, if the strobe duration was determined to be 100 units of time and the desired value for the mechanical aperture is one half the current value, then the duration can be computed to be one half the strobe duration or 50 units of time, assuming that the desired amount of light to be produced was equal to the amount of light produced by the previous bit plane. If the desired amount of light to be produced is different that the amount of light produced by the previous bit plane, then the duration can be further adjusted. With the duration computed, the value can be stored in a memory for use in the displaying of the next bit plane (block 725). The stored value can then be retrieved and used to set a duration of time that the strobe signal is asserted on the strobe signal line.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for driving a solid-state light source, the method comprising:
   charging a first drive circuit;
   discharging the first drive circuit into the solid-state light source;
   charging a second drive circuit;
   discharging the second drive circuit into the solid-state light source; and
   repeating the charging of the first drive circuit, the discharging of the first drive circuit, the charging of the second drive circuit, and the discharging of the second drive circuit until the solid-state light source has produced a desired amount of light.

2. The method of claim 1, wherein the charging of the second drive circuit at least partially overlaps in time with the discharging of the first drive circuit.

3. The method of claim 1, wherein the discharging of the first drive circuit and the discharging of the second drive circuit do not overlap in time.

4. The method of claim 1, wherein each drive circuit comprises a rectifier to remove any AC bias present in a current provided to the solid-state light source, and wherein the charging of a respective drive circuit comprises:
   turning off the rectifier; and
   applying a voltage potential across a transformer in the respective drive circuit.

5. The method of claim 4, wherein each drive circuit comprises a transformer, and wherein the discharging of the respective drive circuit comprises:
   turning on the rectifier; and
   removing the voltage potential across the transformer.

6. The method of claim 5, wherein the voltage potential is removed by severing a current path to the transformer.

7. The method of claim 1 further comprising, prior to the charging of the first drive circuit, turning off a current shunt coupled to the solid-state light source.

8. The method of claim 1 further comprising, after the charging of the first drive circuit or the charging of the second drive circuit, preventing the discharging of the respective drive circuit responsive to a control signal.

9. A light source comprising:
   two current sources coupled to a solid-state light element, each current source configured to provide a drive current to the solid-state light element, wherein the current sources are switched such that only one current source at a time provides the drive current;
   two rectifiers for removing AC bias from the drive current, with each rectifier coupled between one of the two current sources and the solid-state light element; and
   a shunt coupled between the two rectifiers and the solid-state light element, the shunt configured to either direct the drive current away from or to the solid-state light element.

10. The light source of claim 9, wherein the current sources are configured such that one current source is either idle or being charged when the other current source is providing the drive current.

11. The light source of claim 9, wherein each current source comprises:
    a transformer;
    a first transistor having a first terminal coupled to a first power rail of a power supply and a second terminal coupled to a primary winding of the transformer, the first transistor configured to responsively couple the transformer to the first power rail based on a control signal; and
    a second transistor having a first terminal coupled to the primary winding of the transformer and a second terminal coupled to a second power rail of the power supply, the second transistor configured to responsively couple the transformer to the first power rail based on the control signal.

12. The light source of claim 11, wherein the first transistor and the second transistor are biased so that they operate in a saturation region.

13. The light source of claim 11, wherein a current source provides the drive current by charging the transformer in the current source, and wherein after the transformer is charged, the first transistor is turned off while the second transistor if left on to hold the charge in the transformer until the drive current is to be provided to the solid-state light element.

14. The light source of claim 9, wherein the solid-state light element comprises one or more light emitting diodes.

15. The light source of claim 9, wherein the solid-state light element comprises a laser diode.

16. The light source of claim 9, wherein the shunt comprises a switch to couple an output of the two rectifiers back to the transformer responsive to a control signal.

17. A display system comprising:
    a light source configured to produce multi-colored light, the light source comprising two current sources coupled to a solid-state light element, each current source configured to provide a drive current to the solid-state light element, wherein the current sources are switched such that only one source at a time provides the drive current;
    two rectifiers for removing AC bias from the drive current, with each rectifier coupled between one of the two current sources and the solid-state light element; and
    a shunt coupled between the two rectifiers and the solid-state light element, the shunt configured to either direct the drive current away from or to the solid-state light element;
    an array of light modulators optically coupled to the light source, wherein the array of light modulators creates images by setting each light modulator in the array to a state for displaying an image on a display plane by modulating light from the light source; and
    a controller coupled to the array of light modulators and to the light source, the controller configured to issue commands to the light source to produce light of specified duration and color based on the image.

18. The display system of claim 17, wherein the light source utilizes separate solid-state light elements to produce each color of light, and wherein the two current sources, the two rectifiers, and the shunt are replicated for each different color producing solid-state light element.

19. The display system of claim 17, wherein the light source further comprises an optical tap to measure the amount of light produced by the solid-state light element.

20. The display system of claim 17, wherein the array of light modulators is a digital micromirror device.

* * * * *